May 12, 1970 H. LEISRING 3,511,562

METHOD OF AND APPARATUS FOR CONTROLLING THE MOVEMENT OF AN INFORMATION CARRIER

Filed March 27, 1968

INVENTOR
Herbert Leisring
BY
Michael S. Striker
ATTORNEY

United States Patent Office 3,511,562
Patented May 12, 1970

3,511,562
METHOD OF AND APPARATUS FOR CONTROLLING THE MOVEMENT OF AN INFORMATION CARRIER

Herbert Leisring, Stuttgart-Stammheim, Germany, assignor to Robert Bosch Elektronik und Photokino GmbH, Stuttgart-Unterturkheim, Germany Filed Mar. 27, 1968, Ser. No. 716,595
Claims priority, application Germany, Apr. 8, 1967, B 91,985
Int. Cl. G03b 21/50
U.S. Cl. 352—92 7 Claims

ABSTRACT OF THE DISCLOSURE

A method of and an apparatus for controlling the movement of an information carrier wherein the information carrier is a strip provided with at least two longitudinally spaced discrete groups of encoded information separated by an interval portion. A first indicium is provided adjacent the beginning of the interval portion and a second indicium is provided adjacent the beginning of each group of information. The carrier is moved at a first speed past a reproducing station so that a first group of information moves past the station. During movement of the carrier the same is scanned for the first indicium and, in response to detection of the same, the speed is automatically lowered until during further scanning the second indicium is detected, whereupon the carrier is arrested.

BACKGROUND OF THE INVENTION

The present invention relates to a method of controlling the movement of an information carrier, and more particularly of an information carrier having provided thereon at least two longitudinally spaced discrete groups of encoded information which are separated by an interval portion. Still more specifically, the present invention relates to a method of controlling the movement of such an information carrier which is in form of a film. The invention also relates to an apparatus or an arrangement for carrying out the method.

The invention will hereafter be described with reference to a film as an information carrier. However, it is to be understood that this is by way of example only and that an information carrier may not necessarily be strip-shaped, just as instead of visual material in the form of film frames it may have encoded thereon the information in form of electric-impulse-producing means.

As pointed out, the invention will be discussed with particular reference to a film strip as an information carrier. In this context it is well known that it is frequently necessary to interrupt the showing of a film for various reasons, a procedure which is particularly prevalent in the television industry where it is necessary to provide a time interval between successive portions of the film, during which time interval the announcer may have to deliver a commentary or a commercial message may be presented. To provide such a time interval it is of course necessary that the advancement of the film through the film projector be arrested at a suitable point, that is at the end of a particular scene or sequence, and that advancement of the film be resumed when the desired interval is over.

Heretofore, it has been customary to separate film portions which show two different scenes or sequences between which a commentary or a commercial message is to be presented, by means of a spacer strip which is secured to both of the film portions. Thus, when the first film portion comes to an end the film drive means is switched off, usually in automatic response to detection of a suitable marking provided at the end of the first film portion. Inertia will of course continue to carry the film forwards until the drive has completely stopped. This is the reason for the spacer strip provided between the first and the subsequent film portion, the purpose of this spacer strip being to assure that the film will be completely stopped before the opening frames of the subsequent film portion reach the projector. However, this has not been found entirely satisfactory because the time period required before the switched-off drive of the film-advancing mechanism is completely stopped, will not be constant. Rather, it will vary from case to case depending upon the mechanical condition of the drive, prevailing temperature and similar circumstances. Thus, the length of film—which term here includes the spacer strip—which will continue to move through the projector before the film is completely stopped will vary from case to case and it is clear that, if it is to be assured that the opening frames of the subsequent film portion will stop upstream of the projector, the spacing strip must have a length which guarantees this desired result even under the most adverse condition, namely in case of the longest possible inertial advancement of the film strip.

Unfortunately, this brings up the problem that, if the inertial advancement is relatively short, a rather considerable portion of the spacing strip must pass through the projector when the drive is started up again and before the opening frames of the subsequent film portion can be projected. This is of course no more desired than the aforementioned other possibility. To compensate for this it has heretofore been the practice to employ a specially skilled technician whose responsibility it is—after projection of the first film portion and during the time interval during which commentary or a commercial message is being presented—to switch the film drive on and off repeatedly until the opening frames of the subsequent film portion approach the projector. The purpose is to advance the subsequent film portion until for instance its first film frame appears in the film window of the projector. This cannot, however, be accomplished by means of the film drive which advances the film too fast for this purpose. Therefore, the technician employed for this purpose will advance the beginning of the subsequent film portion via the film drive to the vicinity of the film window in the projector and will then continue to advance the film manually until the starting portion, for instance the first frame of the subsequent film portion, will be visible in the film window of the projector. This is, of course, economically undesirable because the technician employed for this purpose must not only have special training but must be constantly available in the immediate vicinity of the equipment and therefore cannot carry out any other functions.

It is therefore a general object of the present invention to overcome these disadvantages which have been outlined above.

SUMMARY OF THE INVENTION

In accordance with one feature of my invention I provide a method of controlling the movement in predetermined direction of an information carrier, such as a film or the like having provided thereon at least two longitudinally spaced discrete groups of reproducible encoded information which are separated by an interval portion. In carrying out my method I provide on this carrier adjacent the beginning of the interval portion a first marking or indicium and adjacent the beginning of each of the groups of information a second marking or indicium. The carrier is then moved in the aforementioned predetermined direction at a first speed, that is if the carrier is a film at the speed at which it is to be projected, so that the first group of information moves past the reproducing station, which in the case of film will be a projector. During such movement of the film at the first speed the carrier is being scanned until the first indicium at the beginning of the interval portion is detected. The signal which is produced in response to such detection is utilized for slowing the movement of the carrier from the first speed to a slower second speed so that the interval portion advances past and through the reproducing station at this second speed. Scanning of the carrier during movement at the second speed is continued until the second indicium adjacent the beginning of the second or subsequent group of information is detected, and the signal produced on such detection is utilized for arresting the drive and therefore the movement of the carrier. Thus, the latter is arrested in a position at which the beginning of the second group of information is located at the reproducing station and the second group is ready to be reproduced when the movement of the carrier is resumed.

The advantage of this method resides, of course, in the fact that the carrier moves, during the period between detection of the first and the second indicium, at a considerably lower speed than the first speed at which the information of the first group was being reproduced. At this lower second speed switching-off of the carrier or film drive will produce instantaneous or near-instantaneous arresting of the carrier movement because little or no inertial advancement will take place.

By resorting to my above-mentioned novel method, and utilizing the apparatus which carries out the method, manual advancing of the carrier in the manner and for the purposes outlined earlier is eliminated while the user is assured that the carrier is always arrested in position in which the beginning of the second group of information, that is of the second or subsequent film portion, is in a position where the information of this second or subsequent group is ready for immediate reproduction. That this result is indeed obtained according to my invention will be immediately understood if one considers that for instance a film may be ordinarily advanced at a projection speed of 25 frames per second, and that this speed of advancement will be reduced on detection of the first indicium to a speed which would correspond for example to 5 frames per second. Evidently, with a speed reduction of this magnitude instantaneous or near-instantaneous arresting of the film on detection of the second indicium is possible without any difficulties.

Not only will resort to my invention eliminate the need for a skilled technician to be available for the purposes outlined above, but it will even permit remote control of the projection equipment which is evidently a highly desirable feature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
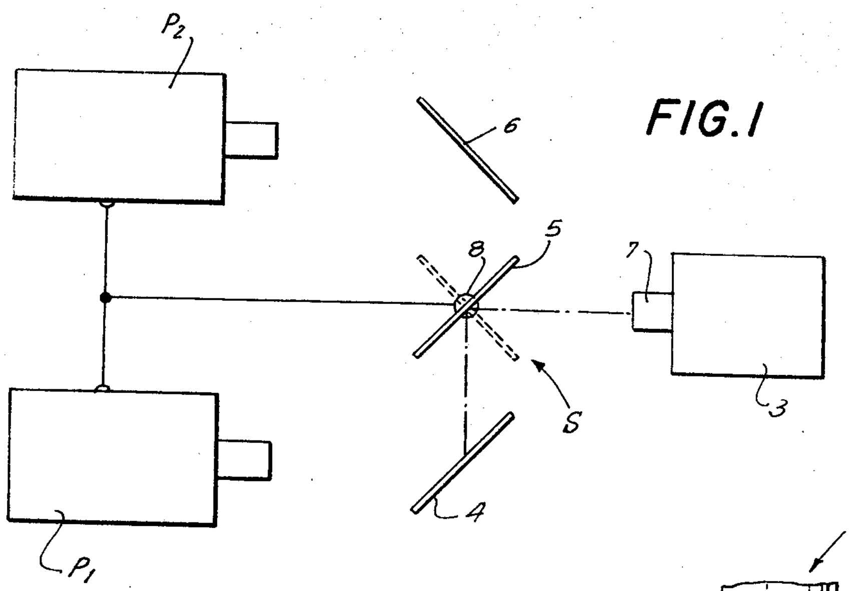
FIG. 1 is a diagrammatic illustration of an arrangement of the type with which my invention may be utilized.

Discussing now the drawing in detail, and firstly FIG. 1 thereof, it will be seen that what is here illustrated is the type of arrangement typically used in television stations. Reference designations $P_1$ and $P_2$ each identify a projector, and reference numeral 3 identifies a television camera into whose objective 7 one or the other of the projectors $P_1$ and $P_2$ is to project its images. It will be appreciated that my invention is fully applicable to a single projector or, indeed, any other reproducing device depending on the type of information carrier which is being utilized. In the illustration of FIG. 1, however, it is assumed that film is to be projected and two of the projectors are being shown because this is the customary arrangement used in television studios.

To make it possible to project into the objective 7 of the television camera 3 from whichever projector it is desired to use, a mirror system S is provided which is located intermediate the camera 3 and the projectors 1, 2. This mirror system S comprises two immovable mirrors 4, 6 and a turnable mirror 5 which is mounted for example on a turnable magnet member 8 and which can assume the full-line position and the broken-line position shown in FIG. 1. In the full-line position illustrated it will be appreciated that images projected from the projector 1 are reflected by the stationary mirror 4 into the turnable mirror 5 and from there into the objective 7 of the camera 3. Conversely, when the mirror 5 is in the broken-line position, then images projected by the projector 2 will be reflected via the mirror 6 into the mirror 5 and from there into the objective 7 of the camera 3. The turnable magnet 8 is electrically connected with the projectors 1 and 2 in known manner and in such a way that, when a signal is produced by a suitable marking provided at the end of one program portion of the film being projected in one of the projectors, the mirror will be turned by the magnet member 8 so that it will now reflect the images from the other projector into the objective 7. Thus, one of the projectors may for instance be utilized to project program material, such as photographed sequences in a news program, and the other projector may be utilized to project commercial messages which are to be interspersed with the news program sequences.

Figure 3:
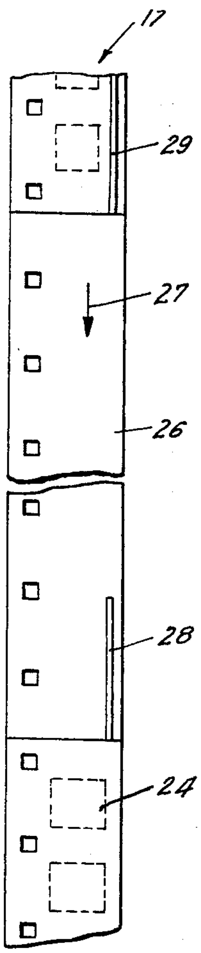
FIG. 3 is a fragmentary plan view of an information carrier for use in accordance with my invention.

Coming now to FIG. 3, it will be seen that this illustrates a program carrier here assumed to be a film 17 comprising two film portions 24 and 25 each of which has a plurality of film frames (indicated in dotted lines) which are to be projected by a projector. The film portions 24 and 25 are connected to one another by a spacer portion or strip 26 which is simply blank, that is it does not contain any film frames. The direction in which the film 17 will advance towards and through the projector is indicated by the arrow 27.

It will be seen that the downstream end of the spacing strip 26, that is the end which is connected with the portion 24, is provided with a first marker 28 whereas a second marker 29 is provided at the beginning of the film portion 25, that is at the downstream end of the film portion 25 immediately upstream of the spacer strip 26. In FIG. 3, the markers 28 and 29 are assumed to be constituted by strips of electrically conductive foil which have been suitably affixed to the film 17. Of course it will be clear that this is by way of example only and that the markers could be provided in form of strips or other configurations which are painted on with metallic conductive paint, that they could be constituted by electrically conductive embedments having an exposed surface, or that they need not be electrically conductive at all in the event that the scanning or detecting means which is to co-operate with them operates on a different principle, for instance on the photoelectric principle.

Figure 2:
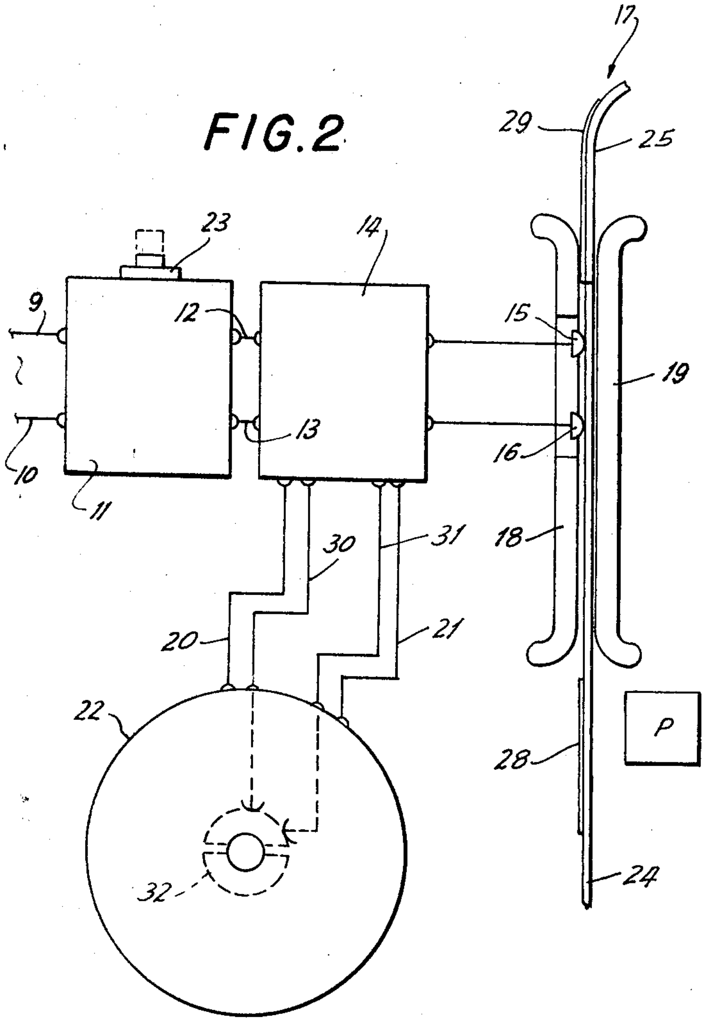
FIG. 2 illustrates in diagrammatic manner a circuit arrangement according to my invention.

FIG. 2 shows a schematic illustration of a circuit arrangement in conjunction with which the film of FIG. 3 is utilized. The film is again identified with reference numeral 17 and it will be seen that it moves in the direction of the arrow 27 (compare FIG. 3) through a guide channel defined by the two guide members 18 and 19. A source of alternating electric current, which is not identified with a reference numeral, is connected via two conductors 9, 10 with a switching device 11 which in turn is connected with another switching device 14 by the conductors 12, 13. The construction of the switching devices 11 and 14 is of no importance in the present invention and they therefore will not be described in more detail, particularly in view of the fact that they are known to those skilled in the art. The switching device 14 is connected in this embodiment with two electrically conductive sensing members 15, 16 which project through a cut-out in the guide member 18 and engage the surface of the film 17 so that they slide along the surface when the film 17 moves in the direction of the arrow 27. Two conductors 20, 21 connect the switching device 14 with the drive motor 22 which effects, in known manner, the advancing of the film 17 in direction of the arrow 27. A manually operable push-button 23 is provided on the switching device 11 and must be depressed to start the motor 22.

It will be appreciated from the drawing that the length of each of the markers or strips 28, 29 is such that each thereof is capable of bridging the members 15 and 16, that is to engage them both as the respective marker passes underneath the members 15, 16 in what obviously will be electrically conductive contact therewith.

It is clear that, as the film 17 advances in the direction of the arrow 27, the marker 28 will move beneath the contact or engaging members 15, 16 and, because of its predetermined length, will at one moment during its passage be in contact with them both. This effects completion of the electric circuit across the members 15, 16, resulting in the production of signals which are utilized to reduce the advancement speed of the film 17 in the direction of the arrow 27. For example, the signal thus produced which is of course is fed to the switching device 14, may be used in the latter to initiate a braking current which is supplied to the drive motor 22 by the conductors 30, 31 connecting the motor with the switching device 14. If this is the approach used, then the circuit with which the conductors 30, 31 are connected is provided with a centrifugal-contact switch 32 which is coupled with the motor 22 and which temporarily interrupts the braking-current circuit when the reduced speed of rotation has been reached by the motor 22, only to close the braking-current circuit again if and when the motor 22 should speed up and exceed a predetermined number of rotations per minute. This opening and closing of the braking-current circuit continues while the spacer strip 26 passes underneath the members 15, 16. During this time the film 17 advances at a significantly reduced speed, for instance a speed corresponding to perhaps 5 frames per second as compared to the initial projection speed of perhaps twenty-five frames per second. FIG. 2 illustrates a position of the film 17 in which the same is already being advanced at the reduced speed and in which the second indicium constituted by the marker 29 is about to pass into engagement with the members 15 and 16. When this takes place the circuit is again completed across the members 15 and 16 and this results in production of a further signal which in turn is utilized to stop the motor 22 and thus arrest further advance of the film 17 in the direction of the arrow 27. This can be accomplished, for example, by effecting opening of the switch 23 via a relay and simultaneously feeding a strong braking current to the motor 22. Precise details how this can be carried out will be known to those skilled in the art and do not form a part of the present invention. It is, however, to be emphasized that when the motor 22 is thus stopped, the further advancing of the film 17 is arrested instantaneously or near-instantaneously so that the first frames on the film portion 25 will be located immediately upstream of the projection window of the projector P which is indicated diagrammatically in FIG. 2.

It will be appreciated, of course, that various modifications within the scope of the present invention are feasible. Thus, advancement of the film at the slower speed may be carried out, according to a different concept, by providing a second or auxiliary motor which is connected with a drive shaft of the projector whose main drive is constituted by the motor 22, such connection being effected via a free-wheel type coupling. This auxiliary motor may be energized by the marking 28 and is so constructed so as to advance the film at the significantly lower speed which is desired for the reasons set forth above. In such a construction the auxiliary motor will take over advancing of the film in the direction of the arrow 27 via the free-wheel type coupling only after the marking 28 has initiated braking of the main motor 22 and when the rotational speed of the latter has fallen below a predetermined value. Advancing of the film at the lower speed is then taken over by the auxiliary motor and the same, as well as the main drive motor, are shut down by the signal resulting from contact of the marking 29 with the members 15 and 16. Of course, to restart the drive motor 22 in order to show the program material on the film portion 25 it is necessary to again depress the push-button 23. In view of the fact that the time interval desired between termination of the showing of the program material on the film portion 24 and starting of the showing of the program material on the film portion 25 usually will vary, depending upon the commentary or the length of the commercial message, this depressing is not effected automatically. Rather, it will be carried out manually or, if desired, by remote control from a central control console from which all of the various devices may be supervised and operated and which is not illustrated because it is of no consequence for the purposes of the present invention.

For the sake of completeness, it should also be mentioned that the marking 28 signalling the end of the film portion 24 may of course also be utilized to switch off the light source of the projector and/or to control other devices, for instance to switch on another projector, to turn the mirror 5 shown in FIG. 1, or any other desired device.

It will be understood that each of the elements described above, or two or more together, may also find a useful application in other types of arrangements differing from the types described above.

While the invention has been illustrated and described as embodied in a method and arrangement for controlling the movement of an information carrier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of controlling the movement in predetermined direction of an information carrier having provided thereon at least two longitudinally spaced discrete groups of reproducible encoded information separated by an interval portion, comprising the steps of providing on said carrier adjacent the beginning of the interval portion a first indicium and adjacent the beginning of each group of information a second indicium; moving said carrier in said predetermined direction at a first speed to thereby advance a first one of said groups of information past a reproducing station; scanning the carrier during movement thereof at said first speed for detecting said first indicium, and utilizing signals produced on detection of said first indicium for slowing the movement of said carrier from said first speed to a slower second speed at which said interval portion advances past said reproducing station; and scanning the carrier during movement thereof at said second speed for detecting said second indicium, and utilizing signals produced on detection of said second indicium for arresting movement of said carrier so that the latter is arrested in a position at which the beginning of the second one of said groups of information is located at said reproducing station and said second group is ready to be reproduced when movement of said carrier is resumed.

2. A method as defined in claim 1, said carrier being a length of film with said groups of information each comprising a plurality of reproducible film frames, and said reproducing station including a film projector; and further comprising the step of projecting such film frames during advancing of a respective group of information past said reproducing station.

3. A method as defined in claim 1, said indicia being electrically conductive and said carrier being electrically non-conductive, and wherein the step of scanning the carrier comprises contacting the carrier with a pair of electrically conductive spaced-apart terminals so positioned as to be conductively bridged by the respective indicium for thereby completing an electric circuit.

4. A method as defined in claim 1, said indicia being electrically conductive, and wherein detection of the respective indicium effects completion of an electric circuit and production of the signals which are to be utilized.

5. In an arrangement of the character described, the combination of an information carrier having provided thereon at least two longitudinally spaced discrete groups of reproducible encoded information separation by an interval portion; first indicium means provided on said carrier adjacent the beginning of said interval portion and second indicium means provided on said carrier adjacent the beginning of the respective groups of information; reproducing means for reproducing the information encoded on said carrier; advancing means operative for advancing said carrier in a predetermined direction and at a first speed past said reproducing means so that the same may reproduce the information of the leading one of said groups; and combined detecting and control means associated with said advancing means and said carrier, said combined means being operative for detecting said indicium means and for effecting a reduction from said first to a slow second speed on detection of said first indicium and arresting of the carrier on detection of said second indicium means.

6. In an arrangement as defined in claim 5, wherein said carrier is a length of film and said discrete groups of information are each constituted by a plurality of film frames, and wherein said reproducing means is a film projector.

7. In an arrangement as defined in claim 5, wherein said advancing means comprises an electric motor, and wherein said combined detecting and control means comprises electric circuit means having an energized state and a nonenergized state and being associated with said electric motor and said carrier, said circuit means being constituted and arranged for being changed from one to the other of said states in response to detection of the respective indicia means and for consequently producing signals controlling operation of said electric motor.

References Cited

UNITED STATES PATENTS 1,950,518 3/1934 Read ---------------- 352—92
3,309,163 3/1967 White ---------------- 352—92

NORTON ANSHER, Primary Examiner

A. MATHEWS, Assistant Examiner

U.S. Cl. X.R.

226—45; 352—236